US005472545A

United States Patent [19]

Malki

[11] Patent Number: 5,472,545

[45] Date of Patent: Dec. 5, 1995

[54] METHOD FOR AFFIXING LABELS TO SOAP BARS AND LABELED SOAP BARS PRODUCED THEREBY

[76] Inventor: Jehuda Malki, P.O. Box 46, Beit Dagan 50250, Israel

[21] Appl. No.: 291,828

[22] Filed: Aug. 17, 1994

Related U.S. Application Data

[63] Continuation-in-part of Ser. No. 255,091, May 17, 1994, which is a continuation of Ser. No. 800,758, Dec. 2, 1991, abandoned, which is a continuation of Ser. No. 482,773, Feb. 21, 1990, abandoned.

[30] Foreign Application Priority Data

Feb. 22, 1989 [IL] Israel ........................ 089386
Feb. 1, 1990 [IL] Israel ........................ 093254

[51] Int. Cl.[6] .................................... B32B 31/12

[52] U.S. Cl. .................... 156/252; 156/245; 264/273; 252/92; 252/134; 252/DIG. 16

[58] Field of Search ................ 252/90, 92, 93, 252/134, 174, DIG. 16; 264/273, 509; 428/139; 156/252, 245

[56] References Cited

U.S. PATENT DOCUMENTS

| | | | |
|---|---|---|---|
| 1,457,217 | 3/1921 | Dostal . | |
| 1,827,549 | 1/1930 | Villain . | |
| 1,983,002 | 4/1934 | Reeves . | |
| 2,071,921 | 2/1937 | Dickson | 428/139 |
| 2,560,097 | 7/1951 | Emerson et al. | 252/174 |
| 3,432,325 | 3/1969 | Baba . | |
| 3,522,345 | 7/1970 | Olsen | 264/273 |
| 3,565,709 | 2/1971 | Grebe . | |
| 4,078,482 | 3/1978 | Goerig et al. . | |
| 4,156,707 | 5/1979 | Joshi | 252/134 X |
| 4,181,695 | 1/1980 | Rickert | 264/150 |
| 4,288,341 | 9/1981 | Hooper et al. | 252/107 |
| 4,297,228 | 10/1981 | Kamada et al. . | |
| 4,297,339 | 10/1981 | Craven | 424/19 |
| 4,908,159 | 3/1990 | Davies et al. | 252/559 |
| 4,915,994 | 4/1990 | Begelfer et al. | 428/40 |

FOREIGN PATENT DOCUMENTS

| | | |
|---|---|---|
| 37-4022 | 6/1962 | Japan . |
| 59-20800 | 5/1983 | Japan . |
| 6107660 | 9/1984 | Japan . |
| 20768 | of 1898 | United Kingdom . |
| 2148927 | 10/1984 | United Kingdom . |

*Primary Examiner*—James Engel
*Assistant Examiner*—Steven J. Helmer
*Attorney, Agent, or Firm*—Sixbey, Friedman, Leedom & Ferguson; Gerald J. Ferguson, Jr.; Joan K. Lawrence

[57] ABSTRACT

A method for applying substantially permanently affixed printed labels to bars of soap which is readily adaptable to a continuous soap production process and labeled soap bars produced thereby are provided. A layer of a suitable wax composition is applied to one surface of soft, moist pre-pressed bars of soap of a selected size and configuration, a correspondingly configured label including opposed rows of perforations is applied to the wax layer, and the soap bars are fed to a soap press where they are pressed and moulded. A second layer of a suitable wax is then applied over the label and the labeled surface of each soap bar to substantially permanently affix the label to the soap bar.

20 Claims, 1 Drawing Sheet

METHOD FOR AFFIXING LABELS TO SOAP BARS AND LABELED SOAP BARS PRODUCED THEREBY

This application is a continuation-in-part of Ser. No. 08/255,091, filed Mar. 17, 1994, which is a continuation of Ser. No. 07/800,758, filed Dec. 2, 1991, now abandoned, which is a continuation of Ser. No. 07/482,773, filed Feb. 21, 1990, now abandoned.

TECHNICAL FIELD

The present invention relates generally to methods of applying labels and images on sheet materials to soap and specifically to a method for substantially permanently affixing labels to bars of soap and to the labeled soap produced thereby.

BACKGROUND OF THE INVENTION

The application of images to bars of soap is desirable in a number of situations. Hotels, for example, often offer their guests individual soap bars bearing the hotel name or trademark. Soap manufacturers like to affix names or trademarks to their soap products to promote brand identification. In other instances, soap with purely decorative images is desired. No matter what the reason for applying a decorative or information-carrying image to a bar of soap, it is universally desired that the image remain visible on the soap until the soap is substantially completely used tip. The three-dimensional lettering, designs and images often stamped on soap bars quickly wear down as the soap is used and disappear long before the soap is used up. It is highly desired by soap manufacturers, hotels and others who customarily use such information-carrying soaps to have a labeled soap that continues to impart the desired message to the user as long as the soap is usable. It is also highly desired that such a labeled soap be available at a cost comparable to that of producing soap automatically stamped with three dimensional designs and information.

The prior art has proposed methods of decorating or applying information-carrying images to bars of soap. In U.S. Pat. No. 3,565,709 to Grebe, for example, an image-carrying sheet material is smoothed manually onto the face of a piece of soap which has been completely dried. The sheet material and an annular face portion of the soap are then completely covered with a continuous, transparent, waterproof and pliable layer of an organic coating material. As this method is described by Grebe, it can only be conducted manually on dry soap bars, which makes it a very costly way to apply an information-bearing label to a soap bar. Moreover, the image-bearing sheet materials disclosed by Grebe for application to soap bars tend to winkle after the coating has been applied and become detached easily from the soap so that they do not remain on the soap until it is used up.

British Patent No. 20,768 discloses a method for labeling or stamping soap with a label made of paper wherein the label is embedded in a relief or intaglio device including a raised edge around the label stamped in the soap. Although a label embossed on the soap in this manner is not easily removed at first, as the raised edge wears down, the label will separate from the soap and will not remain permanently affixed to the soap until the soap is substantially used up.

U.S. Pat. No. 4,297,228 to Kamada et al. discloses a method of making a decorated soap in which a synthetic resin layer is formed on one surface of the soap, and a printed transfer sheet containing a layer of adhesive is adhered to the resin layer. A backing film is then removed from the transfer sheet to reveal the image. Japanese Patent No. 59-208000 discloses the application of an image-carrying resin film to the face of a bar of soap with a binder and the coating of the image on the film with a plastic paint.

U.S. Pat. Nos. 1,827,549 to Villain; 1,983,002 to Reeves; 3,432,325 to Baba and 4,078,482 to Goering et al. are illustrative of other available methods for applying images to soap bars.

British Patent Application No. 2148927 discloses the application of a layer of a foil sheet material to a bar of soap, but for the express purpose of holding the soap together as it is used.

The prior art clearly fails to address the main problem encountered today in the manufacture of a labeled soap. The cost of producing soap with printed or drawn information-carrying images which remain on the soap until the soap is used up is very expensive unless the image can be affixed to each bar of soap during the continuous production of a large number of bars of soap. The soap is typically very moist and soft during continuous production, and the surface to be affixed with a label will decrease in size as the soap dries. It is not unusual for the soap to lose up to 15% of its original size during production as water evaporates. The available prior art methods of labeling soap result in the labels becoming swollen and distorted and detached from the soap because the soap is not dry. Consequently, any kind of adhesive or glue loses its ability to affix the label to the soap.

The prior art, therefore, has failed to provide a low cost, reliable method of affixing an image-bearing label to a bar of soap during soap manufacture which does not require drying of the soap so that the label remains stable, attractive and affixed to the soap for as long as the soap lasts. The prior art has further failed to provide a low cost labeled soap that substantially permanently retains its label as the soap is used up.

SUMMARY OF THE INVENTION

It is a primary object of the present invention, therefore, to overcome the disadvantages of the prior art and to provide a method for affixing an information-carrying label to a bar of soap that does not require drying of the soap and can be conducted during a soap manufacturing operation to produce a labeled soap product with a label that remains attractively affixed to the soap as long as the soap lasts.

It is another object of the present invention to provide a method for affixing an image-bearing sheet to a bar of soap that is easily adapted to a soap production line.

It is a further object of the present invention to provide a method for labeling soap that is reliable and inexpensive and produces a label which remains affixed to the soap as long as the soap lasts.

It is still another object of the present invention to provide a continuous method of substantially permanently affixing an image-bearing sheet to soap bars that can be conducted when the soap is very moist and soft.

It is still a further object of the present invention to provide a method for affixing an image-bearing sheet or label substantially permanently to a variety of different kinds of soaps.

It is yet another object of the present invention to provide an attractive, inexpensive labeled soap bar with a label that remains substantially permanently affixed to the soap as the soap is used up.

The aforesaid objects are achieved by providing a method of affixing an image-bearing or information-carrying sheet material or label to a surface of a bar of soap that can be incorporated into the production line of a continuous soap manufacturing process. In the soap labeling method of the present invention, a soft, moist pre-pressed bar of soap of a predetermined size and shape is sprayed with a wax composition at a selected pressure and temperature. An image-bearing sheet or label with substantially the same configuration as the surface of the soap bar to be labeled and including rows of spaced perforations on at least two of the opposed edges of the sheet is placed on a wax composition-covered soap bar. The sheet-carrying soap bar is directed into a soap press and subjected to pressure to cause soap to fill the perforations in the edges of the sheet. A coating of a wax composition is then sprayed over the entire surface of the soap bar, including the sheet, at a selected pressure and temperature to a selected coating thickness so that the label is encased in wax, and the soap is then cooled and dried. A layer of a suitable adhesive may be applied between the sheet material and the first wax layer to insure the formation of both chemical and physical bonds. The present invention further provides a labeled soap produced according to the foregoing method.

Other objects and advantages will be apparent from the following description, claims and drawings.

DESCRIPTION OF THE PREFERRED EMBODIMENTS

Figure 1:
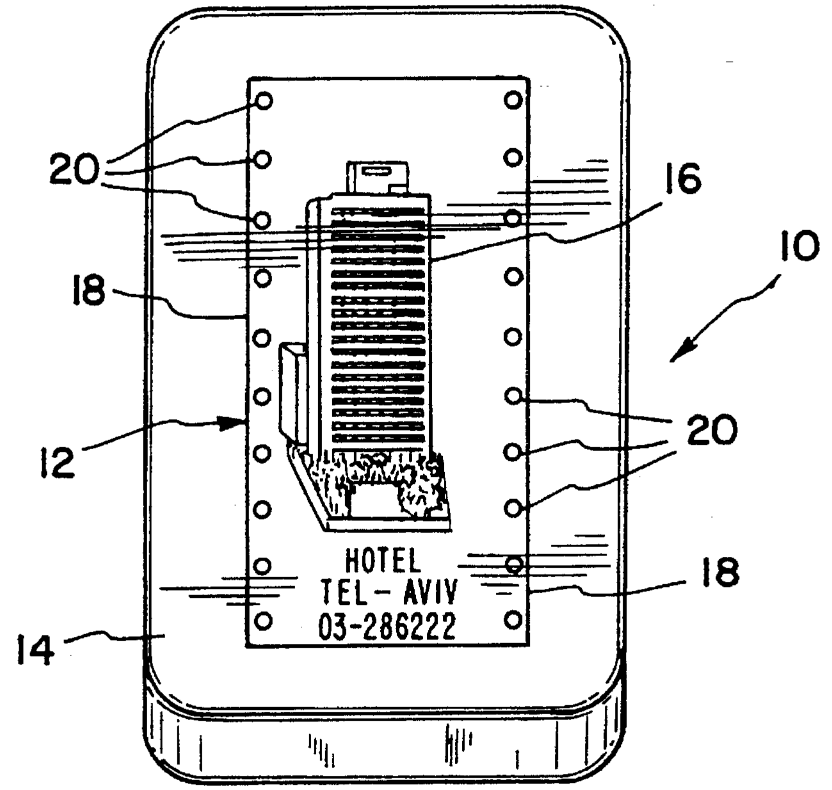
FIG. 1 is a top perspective view of a labeled bar of soap produced according to the method of the present invention.

The application of labels and printed sheet material to individual bars of soap should be an inexpensive form of advertising for hotels, inns and other types of guest establishments. However, until the present invention, a method of labeling soap bars to produce inexpensive labeled soap bars where the label lasted as long as the soap that could also be readily incorporated into a soap manufacturing production line was not available. The labeling method of the present invention can be used with a continuous soap production process to apply desired printed and hand drawn images or information—pictures, advertising material and the like— to at least one surface of a bar of soap at little additional cost beyond that of the soap manufacturing process. The present method may also be used with a soap production process that is not automatic or continuous.

The method of the present invention can be used to affix image-bearing sheet material or labels to any of the products that are commonly referred to as "soap" as this term is understood in the art, including, but not limited to, soaps and cleansing bars made of natural and synthetic materials.

It is contemplated that the labeling method of the present invention can be adapted for use in conjunction with any conventionally used soap production process and equipment. One line of soap presses with which the present method has been effectively used is the SAS line of soap stamping machines or presses supplied by SAS di Mariani Tommaso of Seregno, Italy. Some of the SAS presses are capable of pressing or stamping about 200 bars of soap per minute and even about 20,000 bars of soap per hour. However, it is contemplated that the method of the present invention can be employed with both manual and fully automated soap manufacturing processes.

The sheet material or label affixed to each bar of soap according to the method of the present invention can be any material on which can be printed or drawn a desired image which is also compatible with the soap on which it is to be affixed. Examples of sheet materials found to be suitable for use in the present method include sheet materials made from paper, cellophane, cellulose acetate, polycarbonate, fabrics and metal foils, such as those formed from aluminum, copper and gold. Some plastic sheet materials, such as, for example, polyethylene, polypropylene, polyvinyl alcohol (PVA), polyvinyl chloride (PVC) and polyester films and sheet materials, can also be affixed to soap according to the present method. The foregoing sheet materials are intended to be illustrative rather than limiting. Any sheet material on which a picture or text can be printed and/or drawn and which is compatible with the soap to be labeled may be used in the present invention.

The major drawback of the labeled soaps available prior to the process of the present invention has been the tendency of the label or image-bearing sheet material to become wrinkled and ultimately detached from the surface of the soap within a short period of time after the soap is first used. This problem arises because the label is applied to the soap before the soap has dried completely. As the soap dries, the surface area bearing the label becomes smaller as the soap bar is reduced in size and weight, often up to 15% of its original size. The label or sheet material may become swollen and distorted as the soap dries, and the adhesive or glue used to affix the label to the soap will no longer work.

The method of the present invention completely avoids the problem of label preparation and detachment by a combination of steps which insure that the label or sheet material is an integral part of one of the surfaces of the soap bar. According to the present method, bars of soap of a predetermined size are formed from a selected soap, and a layer of a wax composition is formed on one surface of each soap bar, preferably by spraying, to cover the entire surface of the soap bar to a thickness of about 50 to 60 microns. A selected sheet material containing a printed or drawn image or design to be applied to the soap is cut to a configuration substantially the same as that of the surface of the soap bar and to a size that is smaller than that of the surface so that the sheet is surrounded by a margin of soap when the sheet is affixed to the soap. A row of perforations is formed in each of at least two opposed edges of the sheet material, preferably the edges with the longest dimension. If the sheet material is cut to a rectangular configuration, the perforations along the opposed longer edges will give the sheet material the appearance of film used in cameras.

Although soap bars of a substantially rectangular configuration are likely to be the shape most commonly made according to the present process, other configurations, such as, for example, circular, elliptical or triangular could also be used. The present labeling method is especially useful for soap bars with at least one substantially planar surface. However, the method could also be used to affix labels to convexly or concavely curved surfaces.

The perforated and printed sheet material is applied to the coated soap bar, and this assembly is fed to a soap press, preferably one with copper moulds, where sufficient pressure is applied to mould the soap bar and press the sheet material into the surface of the soap, which at this point is soft. A soap press typically applies a pressure of about 500 $kg/cm^2$ to the bar of soap. This causes the sheet material to become embedded in the wax coating, and soap is forced through the perforations in the sheet to form "rivets" which physically adhere the label to the soap. This operation also results in the chemical adhesion of the label or sheet material to the wax composition layer when an adhesive has been applied to the sheet material. In addition, the label is stretched smoothly over the surface of the soap by the press or stamping machine.

A second coating of a wax composition is applied, preferably by spraying, over the label and the entire surface of the soap bar to a thickness of about 50 to 60 microns so that the label is essentially locked within 100 to 120 microns of wax. The margin of wax-covered soap around the label strengthens the label and avoids both the wrinkling of the label and the detachment of the label from the soap, even after the soap shrinks as it dries. In addition, the wax coating imparts elasticity and flexibility to the surface of the soap.

One wax composition preferred for use in the method of the present invention is a mixture of a paraffin and a paraffin emulsifier. However, any hardened wax and compatible wax emulsifier which are compatible with the selected type of soap and the selected label or sheet material and is water-resistant may be used. Examples of suitable kinds of waxes includes beeswax, especially cera alba and cera balena, carnauba wax and hardened white oil. Other materials, such as polyethylene glycol, nonylphenol and even other kinds of soaps, are suitable for some applications. The foregoing list is intended to be merely illustrative, and any natural or synthetic wax which performs the desired functions and achieves the desired results could be used with the method of the present invention.

Some types of sheet materials selected for forming the labels to be applied to soap bars in accordance with the present method may require the application of an adhesive layer to the surface of the sheet material to be applied to the soap to enhance the adhesion of the sheet material to the soap. Acrylic, emulsive and latex adhesives are preferred for this purpose, although other adhesives may also be used effectively.

Figure 2:
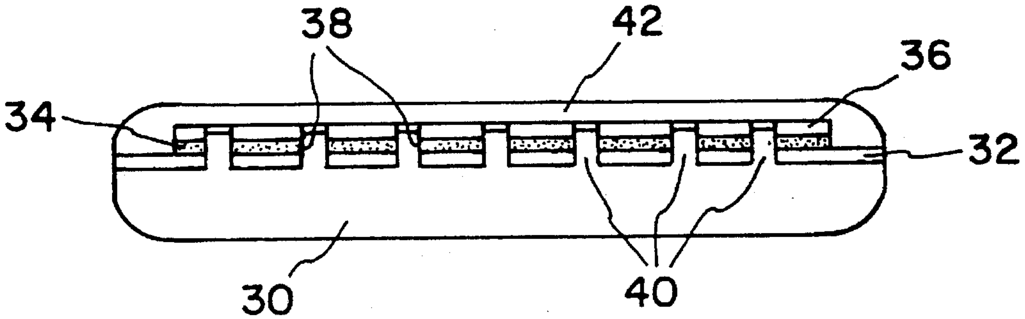
FIG. 2 is a longitudinal cross-sectional view of a labeled bar of soap produced according to the method of the present invention.

Referring to the drawings, FIGS. 1 and 2 illustrate in top perspective and longitudinal cross-section, respectively, a soap bar affixed with a label in accordance with the method of the present invention. FIG. 1 shows a soap bar 10 with a label 12 affixed to a surface 14 of the soap bar. The label 12 has a rectangular configuration and does not completely cover the substantially rectangular planar surface 14 of the soap bar. The label 12 is printed with a picture and other information 16. Each of the opposed longitudinal edges 18 of the label 12 is provided with a row of perforations 20. The perforations 20 are exaggerated as shown in FIG. 1 to illustrate the positioning of the perforations on the label edges, which are also emphasized for purposes of illustration. The perforations and label edges would not normally be clearly visible on a finished labeled soap bar, in large part because they are covered with a layer of wax composition as shown in FIG. 2. The perforations 20 may be circular as shown or may have any other convenient shape.

FIG. 2 is a cross-sectional view of a labeled soap bar taken in a longitudinal direction to show the physical and chemical adherence of the perforated label to the soap bar 30. A wax layer 32, which is preferably about 50 to 60 microns thick, is sprayed on the soap bar 30 according to the present method at a temperature and pressure optionally selected for the kind of wax being sprayed on the soap. In the FIG. 2 embodiment a layer of adhesive 34 is applied to the sheet material forming the label 36. When the wax-covered soap bar to which the adhesive-backed label has been affixed is fed to a soap press or stamping machine and subjected to pressure by the press, the soft and moist soap is forced through the perforations 38 in the label to form "rivets" 40 of wax-covered soap. After the pressed labeled soap leaves the soap press, a second wax layer 42 is applied over the label by spraying at a temperature and pressure selected for the kind of wax so that the label 36 is completely embedded in wax. The label sheet material is typically about 60 microns thick. Therefore, the label, adhesive and wax layers add less than 200 microns to the thickness of the soap bar, which does not appreciably increase the thickness of the soap bar. The wax coating layer 42 may give the labeled surface of the soap bar a different texture or "feel" than the unlabeled surface, depending upon the kind of wax used.

The soap labeling method of the present invention is further illustrated by the following Examples:

EXAMPLE 1

Preparation of Soap:

100 kg of flakes of a selected soap with a moisture content of about 15% was mixed in a suitable mixer with 5 kg of maize starch. The maize starch absorbs excess moisture and prevents the soap from adhering to the walls of the mixer so that the soap flows more quickly and without sticking. The soap mixture was then kneaded and homogenized in a calender or other suitable machine to obtain a homogeneous dispersion of the materials and to impart elasticity to the soap. This operation was repeated several times to dry the soap somewhat and to tighten and improve it. The soap was then transferred to a soap extruder, preferably one with a perforated plate with holes about 6 millimeters in diameter. The soap was mixed in the extruder to eliminate air bubbles and so that the internal volume would be full, rigid and homogeneous and was extruded through a die selected to produce a continuous thickness of soap with selected dimensions. In this case, the soap discharged by the extruder had a width of about 45 millimeters and a thickness of about 15 millimeters. Pre-pressed soft, moist soap bars were obtained by cutting the extrudate into 70 millimeter lengths so that the bars had a substantially planar rectangular surface configuration about 45 millimeters by 70 millimeters.

EXAMPLE 2

Soap bars based on a saponified oil were prepared as in Example 1 above. A wax composition including paraffin and a paraffin emulsifier was heated to about 120° C. and sprayed from a jet under a pressure of about 2 atmospheres onto the extruded soft, moist soap bars to apply a wax coating layer about 60 microns thick to one surface of each soap bar.

A label made of polyvinyl chloride (PVC) with a thickness of about 60 microns and a rectangular configuration smaller than that of the soap bar, which had been color printed with text and graphics was obtained. Each of the long edges of the rectangular label was perforated to form a row of perforations parallel to these edges, which gave the label the appearance of camera or movie film. The perforations had a diameter of about 4 millimeters and were spaced about 5 millimeters apart. An acrylic adhesive was applied to one surface of the label, and the perforated label was placed on the wax-covered soap with the adhesive surface toward the wax layer.

The soap bars carrying the labels as described were fed into a soap press containing copper moulds and were pressed to produce moulded soap bars with the labels embedded in the wax layer. The soap was sufficiently soft that soap filled the perforations in the label, forming "rivets".

A second wax coating was sprayed at 120° C. and 2 atmospheres of pressure over the entire surface of the soap bar, including the label and the margin of soap surrounding the label.

The soap bars were then cooled and dried. The labels adhered smoothly to the surfaces of the bars and did not wrinkle or become detached.

EXAMPLE 3

Bars of a natural herbal soap instead of a saponified oil were prepared according to Example 1, and labels printed with a picture and formed from paper instead of PVC were affixed to the soap bars with cera alba wax instead of paraffin as described in Example 2.

EXAMPLE 4

Bars of a natural herbal soap were prepared according to Example 1, and labels of printed cellophane were affixed to the soap bars with paraffin wax as described in Example 2.

EXAMPLE 5

Bars of a natural Dead Sea mineral soap were prepared according to Example 1, and labels of printed polyethylene were affixed to the soap bars with carnauba wax as described in Example 2.

EXAMPLE 6

Bars of a natural Dead Sea mineral soap were prepared according to Example 1, and labels of printed polyvinyl acetate were affixed to the soap bars with cera balena wax as described in Example 2.

EXAMPLE 7

Bars of a "soapless" soap sold in Israel under the NECA 7 trademark were prepared according to Example 1, and labels of printed cellulose acetate were affixed to the soap bars with paraffin wax as described in Example 2.

EXAMPLE 8

Bars of a soap based on tallow-fatty acids from animal sources were prepared according to Example 1, and labels of printed fabric were affixed to the soap bars with hardened white oil as described in Example 2.

EXAMPLE 9

Bars of a soap based on tallow-fatty acids from animal sources were prepared according to Example 1, and labels of printed cellophane with an acrylic adhesive applied to the soap-contacting surface were affixed to the soap bars as described in Example 2.

EXAMPLE 10

Bars of a mineral soap were prepared according to Example 1, and labels of printed gold foil with an emulsive adhesive applied to the soap-contacting surface were affixed to the soap bars as described in Example 2.

EXAMPLE 11

Bars of a natural black mud soap were prepared according to Example 1, and labels of printed fabric with a latex adhesive applied to the soap-contacting surface were affixed to the soap as described in Example 2.

EXAMPLE 12

Two labeled soaps were prepared with a material other than wax. Bars of a synthetic "soapless" soap of the type sold under the trademarks NECA 7 and HAWAII SHEMEN were prepared according to Example 1. Printed paper labels were then applied with polyethylene glycol (P.E.G. No. 8000) as described in Example 2. Bars of soap based on glycerine fats were also prepared according to Example 1. Printed labels of polyvinyl alcohol were applied to the soap with 12 Mol nonylphenol as described in Example 2.

The labeled soaps produced by the foregoing Examples presented an attractive appearance, and the labels were retained on the soaps until the soap was substantially used up.

The present invention has been described with respect to particular embodiments and Examples which are intended to be illustrative and not limiting.

INDUSTRIAL APPLICABILITY

The present soap labeling method and labeled soap produced according to the method of the present invention will find primary applicability when it is desired to provide, at low cost, high quality, attractive bars of soap bearing printed or hand drawn labels which will remain on the soap as long as the soap is usable.

I claim:

1. A method for substantially permanently affixing a label printed with a desired image to a surface of a bar of soap so that the label remains affixed to the soap as long as the soap is usable, including the steps of:

(a) forming a soft, moist bar of a selected kind of soap having a selected configuration and a selected size;

(b) while the soap is still soft and moist applying a selected thickness of a layer of a wax composition compatible with the soap to the surface of the bar of soap to be labeled at a selected temperature and pressure;

(c) forming a label from a selected sheet material having substantially the same configuration as the surface of the bar of soap and a size that is dimensionally smaller than the surface of the bar of soap and perforating two of the opposite edges of the label to form opposed rows of perforations along said two opposite edges;

(d) printing the desired image on the label.

(e) applying the printed label to the surface of the bar of soap on top of the layer of wax composition;

(f) pressing the soap bar and label in a soap press under sufficient pressure to embed the label in the wax layer and cause soap and wax to fill the perforations, thereby forming rivets extending to the surface of the label;

(g) applying a selected thickness of a compatible wax composition to cover the entire surface of the soap bar and the label and to contact said rivets at a selected temperature and pressure; and (h) cooling and drying the labeled bar of soap.

2. The method described in claim 1, wherein the bar of soap formed in step (a) is formed from a mixture of the selected kind of soap and maize starch.

3. The method described in claim 1, wherein the kind of soap is selected from the group consisting of soaps made of naturally-occurring ingredients and soaps made of synthetic ingredients.

4. The method described in claim 1, wherein the sheet material forming the label is selected from the group consisting of sheet materials made from paper, cellulose acetate, cellophane, polycarbonate, fabric, metal foil, polyethylene, polypropylene, polyvinyl alcohol, polyvinyl chloride and polyester.

5. The method described in claim 1, wherein the soap is pressed in a copper mould in a soap press at a pressure of about 500 kg/cm$^2$.

6. A labeled bar of soap produced according to the method of claim 1.

7. The method described in claim 1, wherein the bar of soap is formed to have a substantially planar surface with a substantially rectangular configuration and the label is formed to have a substantially rectangular configuration that is smaller than the soap surface so that the label does not completely cover the soap surface.

8. The method described in claim 1, further including before step (e) the step of applying a layer of adhesive to the surface of the label to be applied to the bar of soap.

9. A labeled bar of soap produced according to the method of claim 8.

10. The method described in claim 1, wherein the wax layers applied in steps (b) and (g) are applied by spraying said wax composition at said selected temperature and pressure.

11. The method described in claim 10, wherein said wax composition is a wax selected from the group consisting of paraffin, beeswax, carnauba wax, and hardened white oil, and a compatible wax emulsifier.

12. The method described in claim 10, wherein said wax composition is sprayed at a temperature of 120° C. and a pressure of 2 atmospheres.

13. The method described in claim 10 wherein each said wax layer is applied to a thickness of about 50 to 60 microns.

14. A method for producing a labeled bar of soap wherein the label is substantially permanently affixed to a surface of the bar of soap so that the label remains affixed to the soap until the soap is used up, including the steps of:

(a) forming a bar of soft, moist soap with a planar rectangular surface;

(b) while the soap is still moist and soft spraying a layer of a wax composition compatible with the soap on the soap planar rectangular surface;

(c) forming a rectangular label smaller than the rectangular surface with a row of perforations adjacent to each of the opposed longest edges of the label and printing a desired image on one surface of the label;

(d) applying a layer of adhesive to the unprinted surface of the label;

(e) applying the adhesive-covered surface of the label over the wax layer on the soap planar rectangular surface so that the label is surrounded by a margin of wax-covered soap.

(f) pressing the labeled soft, moist soap in a soap press at a pressure which moulds the soap and causes the label to become embedded in the wax layer and soap and wax to fill the perforations in the label, thereby forming rivets;

(g) spraying a layer of a wax composition to cover the label, the rivets and soap margin; and (h) cooling and drying the labeled soap.

15. The method described in claim 14, wherein the soap bar is formed from a mixture containing a saponified oil and maize starch, the wax composition includes paraffin and paraffin emulsifier, and the label is formed of polyvinyl chloride.

16. A labeled bar of soap produced according to the method of claim 14.

17. The method described in claim 15, wherein each layer of wax composition is sprayed to the soap to a thickness of 50 to 60 microns.

18. A labeled bar of soap produced according to the method described in claim 17.

19. A continuous soap production process for producing a large number of bars of soap beating information-carrying labels substantially permanently affixed to at least one surface of each bar of soap, including the steps of:

(a) mixing flakes of a selected kind of soap with maize starch to form a homogeneous and elastic dispersion;

(b) in an extruder further mixing the soap dispersion of step (a) and extruding the mixture to form an extrudate having a desired size and shape;

(c) cutting the extrudate to form a plurality of individual soft, moist bars of soap;

(d) spraying a surface of each of the soft, moist bars of soap with a selected compatible wax composition at a selected temperature and pressure;

(e) applying to each wax-covered bar of soap a label sized to fit the surface of the soap and formed of a sheet material compatible with the soap and having a single row of perforations adjacent to two opposed edges;

(f) feeding each of the label-carrying bars of soft, moist soap into a soap press and applying sufficient pressure to each bar of soap to force soap and wax through the perforations in the label and to mould each soap bar to a desired final shape;

(g) spraying the labeled surface of each bar of soap with a selected compatible wax composition at a selected temperature and pressure;

(h), cooling and drying each of the plurality of soap bars; and (i) continuously repeating steps (a) through (h) until the desired large number of bars of soap bearing information-carrying labels has been produced.

20. The continuous soap production process described in claim 19, wherein each of said compatible wax compositions is sprayed at a temperature of 120° C. and a pressure of 2 atmospheres to form a wax layer having a thickness of 50 to 60 microns, and the pressure applied to each bar in the soap press is about 500 kg/cm$^2$.

* * * * *